(12) United States Patent
Kim

(10) Patent No.: US 6,337,718 B1
(45) Date of Patent: Jan. 8, 2002

(54) TV CONTROLLING METHOD HAVING ADJUST MODE RESET FUNCTION

(75) Inventor: Pan-Jin Kim, Suwon (KR)

(73) Assignee: Samsung Electronics Co., Ltd, Suwon (KR)

( * ) Notice: Subject to any disclaimer, the term of this patent is extended or adjusted under 35 U.S.C. 154(b) by 0 days.

(21) Appl. No.: 09/428,717

(22) Filed: Oct. 28, 1999

(30) Foreign Application Priority Data

Oct. 28, 1998 (KR) .............................................. 98/45345

(51) Int. Cl.⁷ ................................................. H04N 5/50
(52) U.S. Cl. ........................ 348/569; 348/570; 348/734
(58) Field of Search ................................ 348/569, 570, 348/734, 553, 554, 563, 564, 731, 732; H04N 5/50, 5/445

(56) References Cited

U.S. PATENT DOCUMENTS 4,626,892 A * 12/1986 Nortrup ...................... 348/569
5,237,417 A * 8/1993 Hayashi ...................... 348/569
5,774,187 A * 6/1998 Tsunoda ...................... 348/553

FOREIGN PATENT DOCUMENTS

JP          7-15767         1/1995
JP          7-312729        11/1995

OTHER PUBLICATIONS

Korean Patent Office Action, dated Apr. 18, 2001.

* cited by examiner

*Primary Examiner*—Sherrie Hsia
(74) *Attorney, Agent, or Firm*—Robert E. Bushnell, Esq.

(57) ABSTRACT

A TV controlling method having an adjust mode reset function for adjusting a user control on an adjust mode menu screen, the method including selecting a predetermined mode to be changed on the adjust mode menu screen, if a desired mode value is close to the currently set mode value, inputting a corresponding data UP/DOWN key to set a desired mode value, if there is a great difference between the desired mode value and the currently set mode value, inputting a RESET value to set the mode value to a default value set when the TV set leaves the factory and then inputting the corresponding data UP/DOWN key to set a desired mode value, and if an EXIT key is input, returning to a channel screen. If a default value of a desired mode is to be displayed on the adjust mode menu screen, when a viewer wants to set the default value of a desired mode on the adjust mode menu screen, it can be simply set by pressing a reset key. Also, even if the mode value currently set on the adjust mode menu screen is greatly different from a desired mode value, the desired mode value can be easily set by pressing the reset key, and then incrementally increasing or decreasing the default value by a small amount through a data UP/DOWN key until the desired value is obtained.

11 Claims, 2 Drawing Sheets

TV CONTROLLING METHOD HAVING ADJUST MODE RESET FUNCTION

CLAIM OF PRIORITY

This application makes reference to, incorporates the same herein, and claims all benefits accruing under 35 U.S.C §119 from an application entitled TV Controlling Method Having Adjust Mode Reset Function earlier filed in the Korean Industrial Property Office on Oct. 28 1998, and there duly assigned Serial No. 98-45345 by that Office.

BACKGROUND OF THE INVENTION

1. Field of the Invention

The present invention relates to a method for controlling television settings, and more particularly, to a TV controlling method having an adjust mode reset function.

2. Description of the Related Art

In general, a television set is equipped with functions of easily controlling various adjust modes of brightness, color, contrast, visibility, sound and the like by displaying an adjust mode menu on a TV screen. Also, the adjust mode can be controlled using a remote controller according to users' preferences. In such a TV set, the respective adjust mode levels are set to be most suitable to users' preferences when it leaves the factory.

FIG. 1 shows an adjust mode menu screen for adjusting contrast, brightness, color or visibility of a general TV screen. In FIG. 1, if a user intends to adjust the color after an adjust mode menu screen is set, a color bar on the menu of the TV screen is highlighted by adjusting a cursor key installed in a remote controller, and the color level is increased or decreased using a data UP/DOWN key, thereby fine tuning the color to be suitable for a user.

However, if the difference between a contrast or brightness mode value currently set and a desired mode value is great, the corresponding data UP/DOWN key must be kept pressed until the desired level is reached. Also, in order to adjust the mode values to users' preferred basic values when TV sets leave the factory, they must be adjusted using data UP and/or DOWN keys.

SUMMARY OF THE INVENTION

The present invention provides a method for controlling a TV set equipped with a reset function of simply setting on an adjust mode menu screen adjust mode values to default values set when it leaves the factory.

Accordingly, to achieve the above objective, there is provided a TV controlling method having an adjust mode reset function for adjusting a user control on an adjust mode menu screen, the method including selecting a predetermined mode to be changed on the adjust mode menu screen, if a desired mode value is close to the currently set mode value, inputting a corresponding data UP/DOWN key to set a desired mode value, if there is a great difference between the desired mode value and the currently set mode value, inputting a RESET value to set the mode value to a default value set when the TV set leaves the factory and then inputting the corresponding data UP/DOWN key to set a desired mode value, and if an EXIT key is input, returning to a channel screen.

Also, if a RESET key is input when a fine tuning mode is selected, manual fine tuning is canceled.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
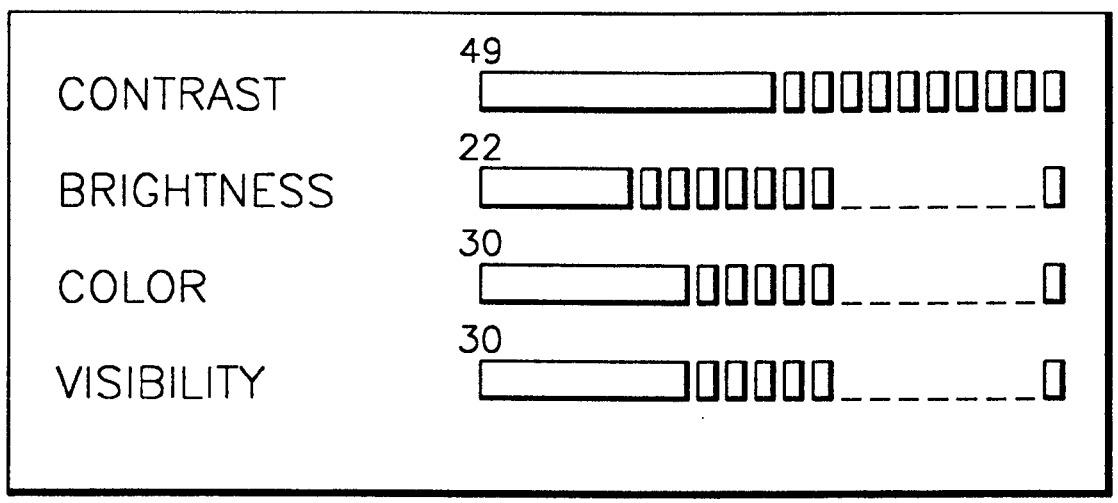
FIG. 1 shows an adjust mode menu screen for adjusting contrast, brightness, color and visibility of a general TV screen.
Figure 2:
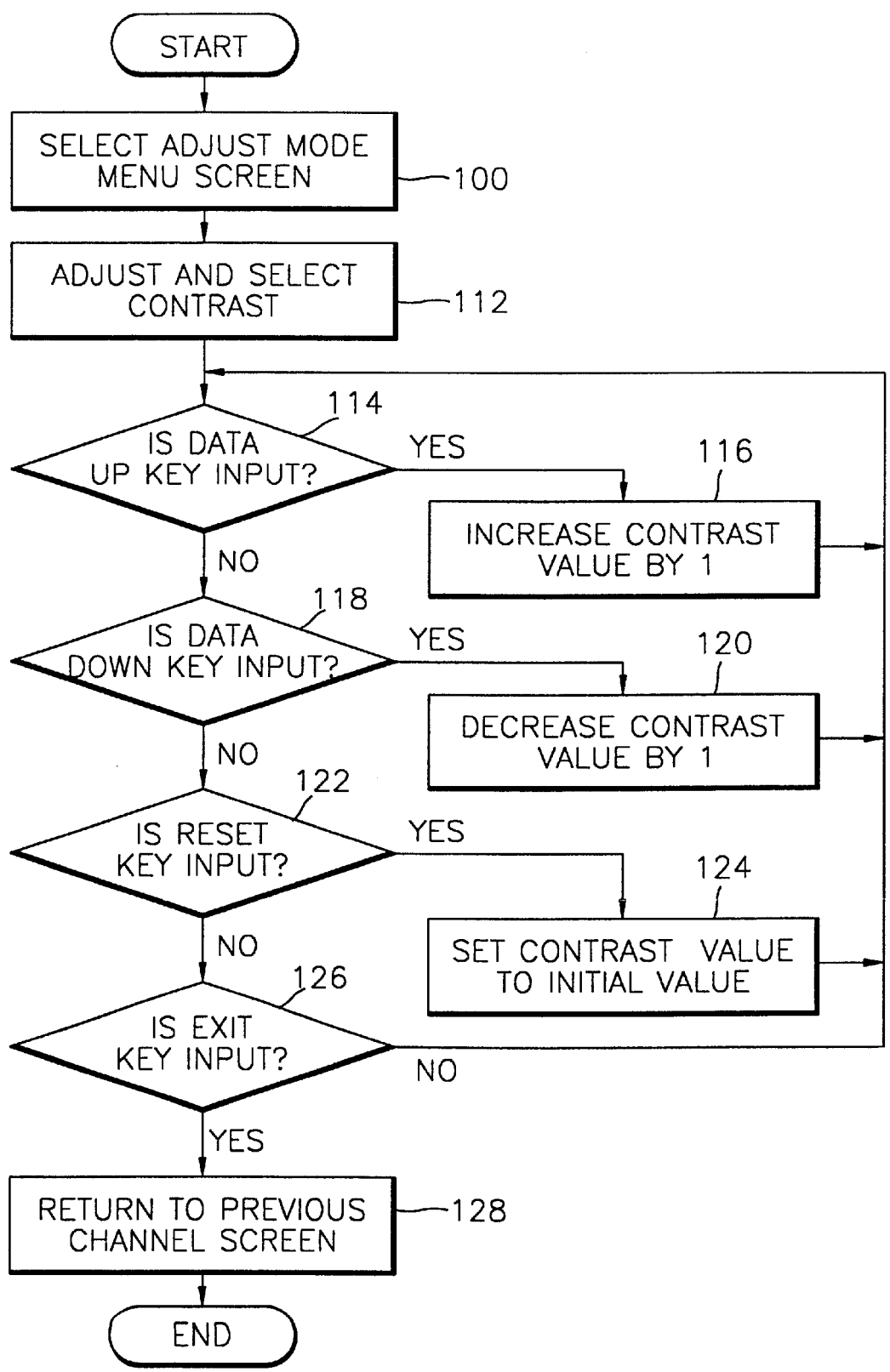
FIG. 2 is a flow chart for illustration of a method for controlling a TV set having an adjust mode reset function according to the present invention.

Referring to FIG. 2, a contrast adjust mode (for example, which could also be a brightness adjust mode, a color adjust mode or visibility adjust mode) is selected from an adjust mode menu screen and a contrast bar is displayed on the screen (steps 100 and 112). It is checked whether a data UP key is input or not (step 114). If yes, the contrast value is increased by one step (step 116). If not, it is checked whether an input key is a data DOWN key or not (step 118). If yes, the contrast value is decreased by one step (step 120). Steps 114 through 120 are performed when the currently set contrast value is close to a desired value. If the input key is not a data DOWN key, it is checked whether a RESET key is input or not (step 122). If yes, the contrast value is set to the default value set when the TV set leaves the factory (step 124). Then, it is checked whether an EXIT key is input or not (step 126). If not, an initial adjust mode menu screen is displayed. If the EXIT key is input, the procedure returns to a previous channel screen (step 128).

In FIG. 2, if a desired value to be adjusted is close to the default value of the selected adjustment mode, the reset function of the corresponding mode is set and then the desired value can be set by adjusting the data UP/DOWN key. That is, when the selected adjustment mode is one of the contrast adjust mode, brightness adjust mode, color adjust mode or visibility adjust mode the reset function sets the corresponding mode to the factory set default value, and then the desired value can be set by adjusting the data UP/DOWN key. Additionally, if the selected adjustment mode is a fine tune adjust mode set for manual fine tuning, the manual fine tuning can be canceled by pressing the reset key.

According to the present invention, when a viewer wants to set the default value of a desired mode on the adjust mode menu screen, it can be simply set by pressing a reset key. Also, even if the mode value currently set on the adjust mode menu screen is greatly different from a desired mode value, the desired mode value can be easily set by pressing the reset key, and then incrementally increasing or decreasing the default value by a small amount through a data UP/DOWN key until the desired value is obtained.

What is claimed is:

1. A television controlling method having an adjust mode reset function for adjusting a user control on an adjust mode menu screen, said method comprising steps of:

displaying the adjust mode menu screen on a screen of said television;

selecting one of a plurality of adjustment modes displayed on the adjust mode menu screen for adjusting one of a plurality of display characteristics;

if a desired mode value is close to a currently set mode value, activating one of a data UP key and a data DOWN key to incrementally adjust the selected adjustment mode to the desired mode value;

if there is a great difference between the desired mode value and the currently set mode value, activating a RESET key to set the value of the selected adjustment mode to a factory set default value and then activating one of the data UP key and the data DOWN key to incrementally adjust the selected adjustment mode to the desired mode value, wherein if said RESET key is input when a manual fine tuning mode is selected, the manual fine tuning is canceled; and returning to a channel screen when an EXIT key is activated.

2. The method according to claim 1, wherein said step of selecting one of a plurality of adjustment modes comprises a step of displaying an adjustment bar corresponding to said selected adjustment mode.

3. The method according to claim 2, wherein said step of activating one of a data UP key and a data DOWN key incrementally adjusts the displayed adjustment bar.

4. The method according to claim 1, wherein said step of selecting one of a plurality of adjustment modes comprises a step of selecting one of a contrast adjustment mode, a brightness adjustment mode, a color adjustment mode and a visibility adjustment mode.

5. A television characteristic controlling method, said method comprising steps of:

selecting a characteristic adjustment mode and displaying an adjust mode menu on a screen of said television;

selecting one of a plurality of adjustment modes displayed on the adjust mode menu for adjusting one of a plurality of display characteristics;

activating one of a data UP key and a data DOWN key to incrementally adjust the selected adjustment mode to a desired mode value;

activating a RESET key to set the value of the selected adjustment mode to a factory set default value, when a difference between the desired mode value and a currently set mode value is great, and then activating one of the data UP key and the data DOWN key to incrementally adjust the selected adjustment mode to the desired mode value; and returning to a channel screen when an EXIT key is activated, wherein said step of selecting one of a plurality of adjustment modes comprises a step of selecting a manual fine tuning mode, said manual fine tuning being canceled when said RESET key is activated.

6. The method as set forth in claim 5, wherein said step of activating one of a data UP key and a data DOWN key is first performed when said desired mode value is close to the currently set mode value.

7. The method according to claim 5, wherein said step of selecting one of a plurality of adjustment modes comprises a step of selecting one of a contrast adjustment mode, a brightness adjustment mode, a color adjustment mode and a visibility adjustment mode.

8. The method according to claim 7, wherein said step of selecting one of a plurality of adjustment modes further comprises a step of displaying an adjustment bar corresponding to said selected adjustment mode.

9. The method according to claim 8, wherein said step of activating one of a data UP key and a data DOWN key incrementally adjusts the displayed adjustment bar.

10. A television characteristic controlling method, said method comprising steps of:

selecting a characteristic adjustment mode and displaying an adjust mode menu on a screen of said television;

selecting one of a plurality of adjustment modes displayed on the adjust mode menu for adjusting one of a plurality of display characteristics;

displaying an adjustment bar corresponding to said selected adjustment mode and having a length corresponding to a current value of the corresponding display characteristic;

determining whether one of a data UP key, a data DOWN key, a RESET key and an EXIT key is activated;

increasing the length of said adjustment bar by one when it is determined that said data UP key is activated and returning to said determining step;

decreasing the length of said adjustment bar by one when it is determined that said data DOWN key is activated and returning to said determining step;

setting the length of said adjustment bar to a factory set default value when it is determined that said RESET key is activated and returning to said determining step, wherein said step of selecting one of a plurality of adjustment modes comprises a step of selecting a manual fine tuning mode, said manual fine tuning being canceled when said RESET key is activated; and returning to a channel screen when it is determined that said EXIT key is activated.

11. The method according to claim 10, wherein said step of selecting one of a plurality of adjustment modes comprises a step of selecting one of a contrast adjustment mode, a brightness adjustment mode, a color adjustment mode and a visibility adjustment mode.

* * * * *